(12) United States Patent
Mortensen et al.

(10) Patent No.: US 7,595,687 B2
(45) Date of Patent: Sep. 29, 2009

(54) APPARATUS AND METHOD FOR REDUCING EMI GENERATED BY A POWER CONVERSION DEVICE

(75) Inventors: Nicolai B. Mortensen, Madison, WI (US); Venkata Giri Venkataramanan, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 339 days.

(21) Appl. No.: 11/496,298

(22) Filed: Jul. 31, 2006

(65) Prior Publication Data
US 2008/0024951 A1 Jan. 31, 2008

(51) Int. Cl.
H02M 1/12 (2006.01)
H02M 1/14 (2006.01)
H02J 1/02 (2006.01)

(52) U.S. Cl. .................. 327/551; 333/177; 455/307
(58) Field of Classification Search .............. None
See application file for complete search history.

(56) References Cited

U.S. PATENT DOCUMENTS

| | | | |
|---|---|---|---|
| 3,849,677 A * | 11/1974 | Stacey et al. | 327/552 |
| 6,636,107 B2 * | 10/2003 | Pelly | 327/552 |
| 6,690,230 B2 | 2/2004 | Pelly | |
| 6,781,444 B2 | 8/2004 | Pelly | |
| 6,794,929 B2 | 9/2004 | Pelly | |
| 6,839,250 B2 | 1/2005 | Takahashi et al. | |
| 6,842,069 B2 | 1/2005 | Takahashi et al. | |
| 7,187,229 B2 | 3/2007 | Pelly | |
| 7,385,438 B2 | 6/2008 | Pelly | |

FOREIGN PATENT DOCUMENTS

WO 03005578 A1 1/2003

OTHER PUBLICATIONS

Yo-Chan Son, et al., IEEE Transactions on Industry Applications, vol. 38, No. 5, pp. 1370-1379, Sep./Oct. 2002.
N.K. Poon, et al., Techniques for Input Ripple Current Cancellation: Classification and Implementation, 2000 IEEE, pp. 940-945.
Yo-Chan Son, et al., A Novel Active Common-mode EMI Filter for PWM Inverter, 2002 IEEE, pp. 545-549.
Satoshi Ogasawara et al., Circuit Configurations and Performance of the Active Common-Noise Canceler for Reduction of Common-Mode Voltage Generated by Voltage-Source PWM Inverters, 2000 IEEE, pp. 1482-1488.

* cited by examiner

*Primary Examiner*—Lincoln Donovan
*Assistant Examiner*—Terry L Englund
(74) *Attorney, Agent, or Firm*—Whyte Hirschboeck Dudek SC

(57) ABSTRACT

An apparatus and method for reducing EMI generated by a power conversion device, as well as a power conversion device employing such apparatus or method (and/or devices employing such a power conversion device) are disclosed. In at least some embodiments, the apparatus includes a hybrid filter for use in reducing EMI. The hybrid filter includes a passive filtering component, and an active filtering component coupled at least indirectly to the passive filtering component. The active filtering component includes a voltage controlled voltage source, and the hybrid filter operates to reduce a level of a common mode current, whereby the EMI generated due to the common mode current is reduced.

18 Claims, 6 Drawing Sheets

APPARATUS AND METHOD FOR REDUCING EMI GENERATED BY A POWER CONVERSION DEVICE

CROSS-REFERENCE TO RELATED APPLICATIONS

--

STATEMENT REGARDING FEDERALLY SPONSORED RESEARCH OR DEVELOPMENT

--

FIELD OF THE INVENTION

The present invention relates to power conversion devices, and more particularly relates to electrical power conversion devices that employ switching devices to achieve power conversion.

BACKGROUND OF THE INVENTION

Switching power converters are useful for converting electrical power having certain characteristics into electrical power having one or more different characteristics. For example, switching power converters can convert a first type of power having a particular voltage or current level or frequency of operation into a second type of power having a different voltage or current level or different frequency of operation. Switching power converters can include, for example, AC to DC converters (e.g., rectifiers), DC to AC converters (e.g., inverters), DC to DC converters (e.g., buck converters, boost converters, and buck-boost converters), and AC to AC converters. Also for example, switching power converters can be single-phase power converters, or multi-phase (e.g., three-phase) power converters. Due to their effectiveness and versatility, switching power converters have become ubiquitous in a variety of applications including residential, industrial and military applications. Their application is further slated to grow in automotive and aerospace systems, for example, in connection with traction-related applications and various accessories.

Despite their wide use, during operation many switching power converters have the undesirable side-effect of generating electromagnetic interference (EMI). This side-effect is particularly disadvantageous insofar as, in recent years, the concern over EMI occurring within and between various types of equipment has become heightened, which in turn has lead to the adoption of various regulatory regimes concerning EMI and electromagnetic compatibility of electrical devices. EMI generated by switching power converters can be particularly significant due to the high frequency switching of electrical quantities (e.g., high frequency changes in voltage and/or current), and due to the short transition intervals involved. The high frequency signal components tend to find parasitic capacitive coupling paths through various circuit elements. In particular, common mode current paths formed by way of the components of switching power converters and parasitic capacitances existing between the converters and ground often constitute a source of significant capacitive coupling and conducted EMI.

In order to mitigate the amount of EMI generated by switching power converters, some conventional switching power converters include or operate in conjunction with passive common mode filters, which can be formed, for example, by way of multiple stages of L-C filters having appropriate damping. These filters commonly are aimed at curbing conducted electromagnetic emissions in the 150 kHz to 2 MHz frequency band, and are designed to provide adequate attenuation across this frequency band to reduce the conducted noise caused by power semiconductor switching devices employed within the switching power converters. While not entirely eliminating EMI, such filters are somewhat effective for use in conventional switching power converters insofar as such power converters often employ power semiconductor switching devices that have an emission spectrum that drops off at 20 dB/decade beyond the switching frequency ($F_s$) of the converter and at 40 dB/decade beyond the transition frequency ($\pi/t_r$), where $t_r$ is the switching transition interval of the switching devices.

Notwithstanding the limited effectiveness of conventional passive common mode filters in reducing the EMI generated by conventional switching power converters, such filters are likely to be less effective in the future as the switching power converter industry moves toward power converters with higher power densities and performance levels that require higher switching frequencies and reduced transition intervals. Higher power densities generally result in higher levels of EMI. Additionally, as the switching frequency of a power converter increases, larger energy levels of noise become present at the low frequency end of the band of interest. Further, as the switching transition interval $t_r$ is reduced, and the transition frequency concomitantly increases, the higher noise level must decay (e.g., at the rate of 20 dB/decade) over a broader range within the frequency range before reaching the transition frequency.

The limitations of conventional passive common mode filters in this regard can be seen in particular by considering an exemplary conventional (Prior Art) passive second order EMI filter 2 as shown in FIG. 1. As shown, the filter 2 is implemented in relation to a power source 4 and a switching power converter 6, which in turn is also coupled to a load 8. The filter 2, power source 4, switching power converter 6, and load 8 overall can be considered to form a system 0. The filter 2 includes an inductor 3 and first and second capacitors 5 and 7, respectively, which are coupled between first and second input terminals 10 and 12, respectively, of the power converter 6 and first and second output terminals 14 and 16, respectively, of the power source 4. More particularly, first and second magnetically-coupled coils 9 and 11, respectively, of the inductor 3 are respectively coupled in series between the first and second output terminals 14 and 16, respectively, and the first and second input terminals 10 and 12, respectively. Additionally, the capacitors 5 and 7 are coupled in parallel within one another between the input terminals 10, 12. The capacitor 5 provides a common mode capacitance and the capacitor 7 provides a differential mode (or normal mode) capacitance, while the inductor 3 provides a common mode inductance. Differential mode inductance occurs in practice only as a result of imperfection and parasitic effects and, ideally, the inductor 3 provides no differential mode inductance. In the exemplary embodiment shown, the capacitor 5 is shown to be broken into two parts 13 and 15, which are coupled in series with one another, and where a node coupling the two is coupled to ground so as to allow for common mode filtering.

Further, in the exemplary embodiment shown, the switching power converter 6 is a buck switching power converter having a first capacitor 17 coupled between the first and second input terminals 10 and 12 and a transistor 19 acting as a switching device, the collector of which is also coupled to the first input terminal 10. The buck switching power converter 6 further includes an inductor 21 coupled between the emitter of the transistor 19 and a first output terminal 18 of the power converter. Additionally, the power converter 6 includes a second capacitor 23 coupled between the first output terminal 18 of the power converter and a second output terminal 25 of the power converter (which are coupled to the load 8) and a diode 27, the cathode of which is coupled to the emitter of the transistor 19 and the anode of which is also coupled to the second output terminal 25 of the power converter, which is the same node as the second input terminal 12. Further, the buck switching power converter 6 is shown to include a parasitic capacitor 29 that links the emitter of the transistor 19 to ground. It is by way of the parasitic capacitor 29 that some of the common mode currents are able to flow, resulting in the generation of EMI by the power converter. Although FIG. 1 shows the power converter 6 to be a buck converter, such a converter is only shown as one example of a variety of different power converters.

Referring again to the filter 2, in combination, the common mode inductance and common mode capacitance form a second order filter to provide common mode noise mitigation, while the differential mode capacitance along with any non-ideal differential mode inductance that may be present form a second order filter to provide effective differential mode noise mitigation. To increase the differential mode attenuation, the capacitance value of the capacitor 7 can be increased to any (or almost any) arbitrary value. Yet the same is not true for the purpose of increasing the common mode attenuation. Rather, because the largest capacitance value of the capacitor 5 is bounded by ground leakage current considerations (as well as, in possibly some circumstances, safety considerations), it is not always possible to use an arbitrarily large capacitor. Further, although a desired level of attenuation could also be obtained by selecting an arbitrarily large inductance value for the inductor 3 (so as to achieve a larger common mode inductance), this is often not possible insofar as large inductors dissipate more heat/power, are physically large, and cannot be easily implemented on integrated circuits.

Given the limitations of conventional passive filters, particularly in terms of their ability to filter common mode currents, efforts have been made to develop other circuits or methodologies for reducing common mode currents. Among these have been circuits that replace the passive filters with active filters or hybrid filters having both passive and active elements. Typically, some such hybrid filters include electronic circuits that are designed to inject noise currents of appropriate magnitude and phase so as to cancel out parasitic common mode noise currents.

Although conventional hybrid filters have some limited effectiveness, conventional hybrid filters are unsatisfactory in their performance. Generating currents that perfectly or substantially cancel out parasitic common mode noise currents is difficult to perform, and becomes even more important as the bandwidth over which those parasitic common mode noise currents occur becomes large. Complicating matters, the operation of conventional hybrid filters often is not easy to model and consequently is not easy to predict or guarantee. Thus, conventional hybrid filters not only are unable to fully achieve the goal of canceling out common mode noise currents, but also it is difficult or impossible to determine why this is so and to determine how the filters can be modified to achieve enhanced performance.

For at least the above-described reasons, therefore, it would be advantageous if an improved device or system could be developed, for implementation as part of or in conjunction with switching power converters, that served to better reduce the EMI generated by such switching power converters, particularly the EMI generated as a result of common mode currents of those power converters. Further, it would be advantageous if in at least some embodiments such an improved device could successfully reduce the EMI of switching power converters that operate at higher power densities, at higher switching frequencies and/or with reduced transition intervals.

BRIEF SUMMARY OF THE INVENTION

The present inventors have recognized the need for an improved device for reducing the levels of EMI generated by switching power converters, and have further recognized the limitations associated with conventional filters used for this purpose. The present inventors additionally have recognized that enhanced EMI reduction can be achieved by an improved hybrid filter having both an active filter and a passive filter, where in at least some embodiments the active filter has a voltage controlled voltage source that effectively enables active control over and boosting of a common mode capacitance of the hybrid filter, particularly as a function of frequency, without any concomitant increase in ambient ground leakage currents.

More particularly, in at least some embodiments, the present invention relates to a hybrid filter for use in reducing EMI. The hybrid filter includes a passive filtering component, and an active filtering component coupled at least indirectly to the passive filtering component. The active filtering component includes a voltage controlled voltage source, and the hybrid filter operates to reduce a level of a common mode current, whereby the EMI generated due to the common mode current is reduced.

Additionally, in at least some embodiments, the present invention relates to a filter for use in relation to a power conversion device. The filter includes an active filtering component that operates to provide a variable first capacitance, wherein as a result the filter operates to reduce a level of a common mode current within the power conversion device, whereby an amount of EMI generated by the power conversion device is reduced.

Further, in at least some embodiments, the present invention relates to a method of operating a power conversion device in a manner resulting in a reduction in an EMI generated by the power conversion device. The method includes providing a hybrid filter that is implemented in combination with the power conversion device, where the hybrid filter includes a passive filter component and an active filter component, the active filter component including a voltage controlled voltage source. The method also includes operating the active filter component so that an overall common mode reactance including a first capacitance of the passive filter component is varied over frequency, and so that a common mode current occurring within the power conversion device is reduced, whereby the EMI generated by the power conversion device is reduced.

DETAILED DESCRIPTION OF THE PREFERRED EMBODIMENT

Figure 1:
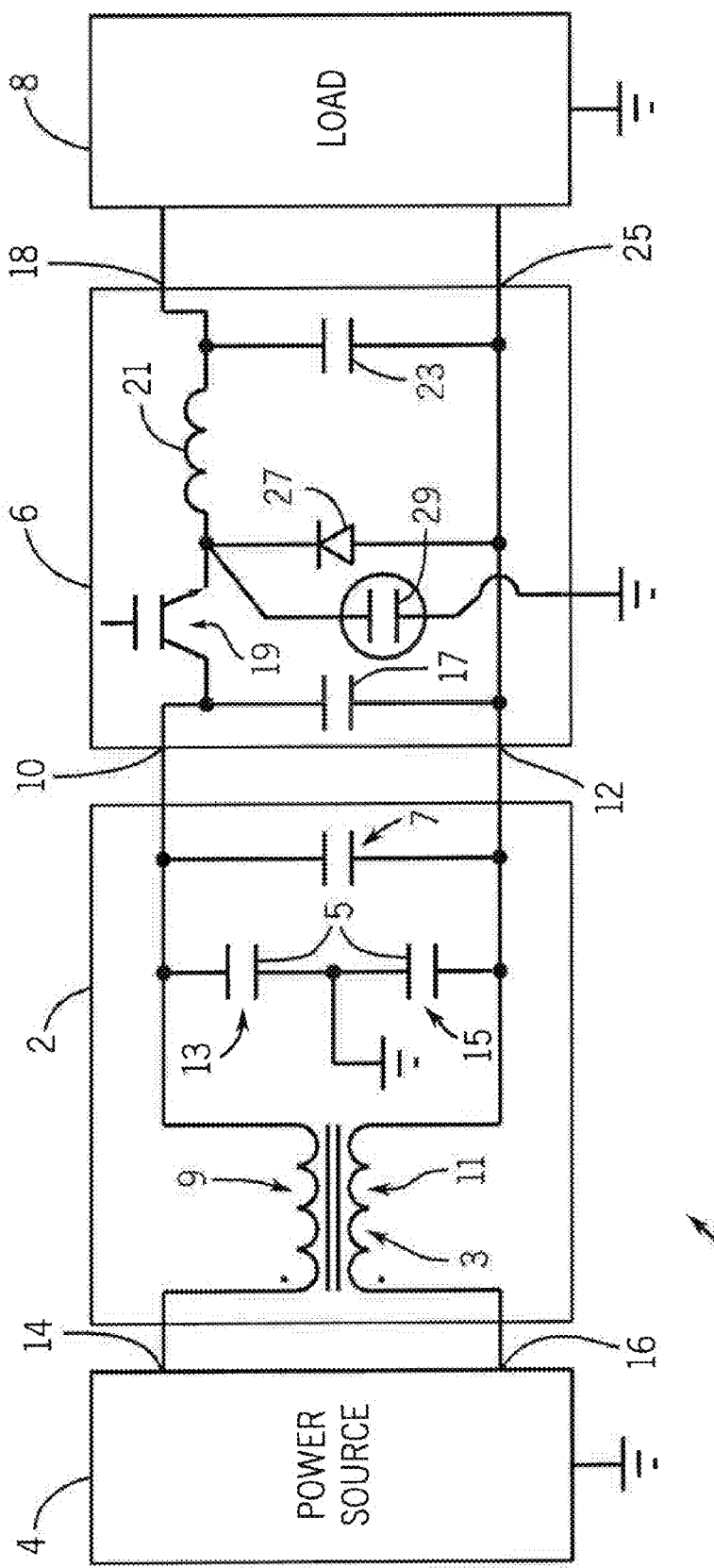
FIG. 1 is schematic diagram showing an exemplary Prior Art passive filter implemented in relation to a switching power converter, along with a power source and a load.
Figure 2:
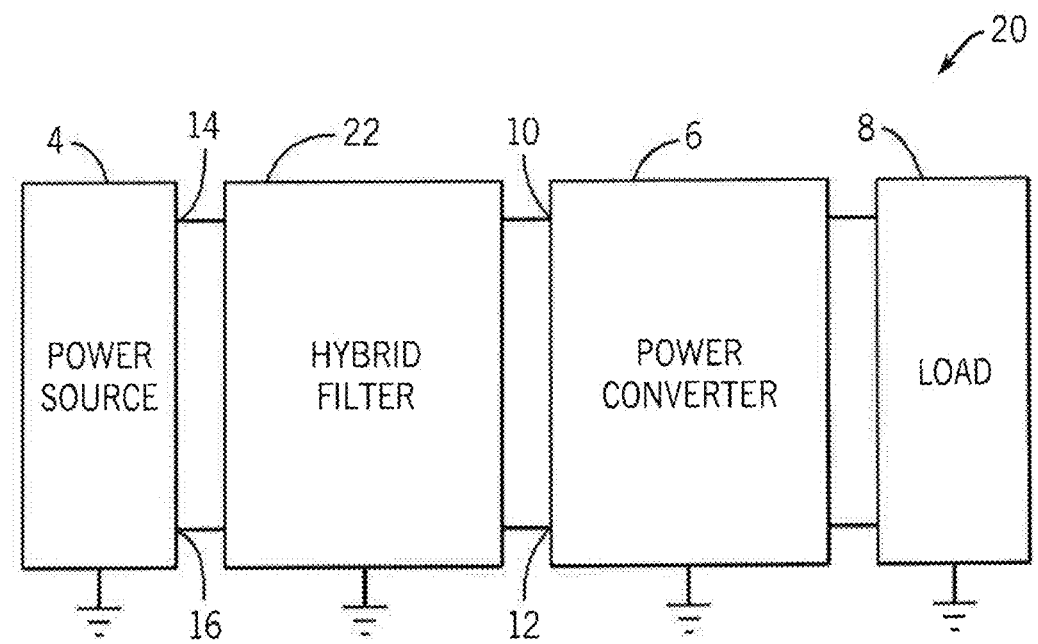
FIG. 2 is schematic diagram showing an exemplary improved hybrid filter implemented in relation to a switching power converter, along with a power source and a load, in accordance with at least some embodiments of the present invention.

Referring to FIG. 2, an exemplary improved version of the power system 0 of FIG. 1 is shown as a power system 20. Although the exemplary power system 20 includes the power source 4, the switching power converter 6 and the load 8 of FIG. 1, the power system 20 in place of the filter 2 instead include an improved hybrid filter 22, in accordance with at least some embodiments of the present invention. As described above with respect to the power system 0, the switching power converter 6 includes first and second input terminals 10 and 12, respectively, and the power source 4 includes first and second output terminals 14 and 16, respectively, to which the hybrid filter 22 is coupled. Depending upon the embodiment, the hybrid filter 22 can be embedded within or as part of the switching power converter 6 or alternatively be a device that, while coupled to the power converter, is nevertheless structurally independent of the power converter 6. In at least some embodiments in which the hybrid filter 22 is embedded as part of the switching power converter 6, the overall circuit is formed as an integrated circuit (albeit possibly one or more components such as inductors may be implemented as discrete components).

Although the switching power converter 6 in the present embodiment is a DC to DC buck switching power converter, as was discussed above with respect to FIG. 1, the present invention is also intended to encompass embodiments in which are implemented other types of switching power converters including, for example, other DC to DC converters (e.g., boost converters and buck-boost converters), AC to DC converters (e.g., rectifiers), DC to AC converters (e.g., inverters), and AC to AC converters. Also for example, the present invention is intended to encompass embodiments in which the power converters handle or interface a single phase of power, as well as embodiments in which the power converters handle or interface multiple phases of power (e.g., power converters capable of receiving and/or outputting three-phase power).

With respect to the power source 4, that power source also can take a variety of forms depending upon the embodiment or application and can be, for example, a DC power source or an AC power source such as a transmission line. It is assumed that, in all embodiments, the power source includes some type of connection to ground (e.g., to earth ground or to another structure that can be considered as ground, for example, the body of a satellite). In a home environment, while the power source could be two prongs of an outlet, it is assumed that a coupling to ground would also be present (e.g., the third prong of a three-prong outlet). Also, for purposes of modeling (or testing) operation of the hybrid filter 22, in some cases the power source can be replaced with the combination of a power source (e.g., a DC voltage source) and a line impedance stabilization network coupled between that power source and the filter.

The improved hybrid filter 22 can take a variety of forms depending upon the embodiment. In general, the hybrid filter 22 includes both a passive common mode filter component and an active common mode filter component that operate in conjunction with one another to reduce the overall amounts of common mode current flowing within the power system 20, particularly within the switching power converter 6. The hybrid filter 22 in at least some embodiments includes both inductive and capacitive components and, to filter common mode currents, the passive common mode filter component includes both an inductive element and a capacitive element. Further, to provide enhanced levels of filtering of the common mode currents without the need for large inductive elements, the capacitive element of the passive common mode filter component is supplemented by the active common mode filter component that is capable of effectively varying and increasing/boosting the common mode capacitance of the filter, particularly as a function of frequency, without any concomitant increase in ambient ground leakage currents (such that ground leakage currents can be maintained within desired or acceptable levels).

Figure 3:
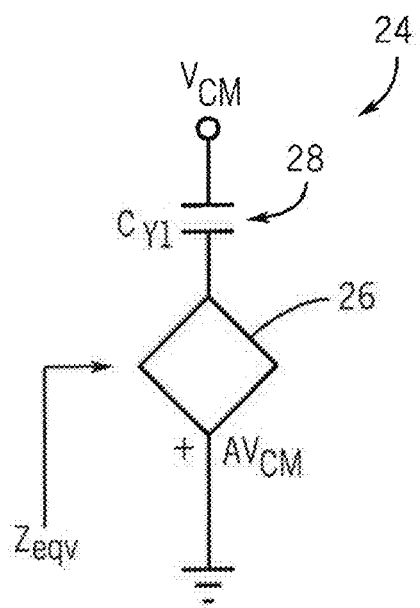
FIG. 3 is a schematic diagram illustrating a boosted common mode capacitance branch of the hybrid filter of FIG. 2, in accordance with at least some embodiments of the present invention.

Referring to FIG. 3, a schematic diagram is provided to illustrate on a conceptual level a boosted common mode capacitance branch 24 of the hybrid filter 22 of FIG. 2. As shown, the branch 24 includes an active element, namely, a voltage controlled voltage source 26 of appropriate polarity that is introduced in series with a common mode capacitor 28 having a capacitance $C_{y1}$. The amplitude of the voltage source 26 is proportional to a common mode voltage $V_{CM}$ that is nominally appearing across the branch 24. An equivalent impedance $Z_{eqv}$ of the branch 24 under this configuration can be determined based upon s (where s represents j2πf, and f is the signal frequency) and the capacitance $C_{y1}$ as follows:

$$Z_{eqv} = \frac{1}{sC_{y1}(1+A)} \quad (1)$$

Thus, the value of $C_{y1}$ is boosted by a factor (1+A), where A is the gain of an amplification network used to realize the voltage source 26 (one example of which is shown in FIG. 3). Due to the increased capacitance that is created by the operation of the active element (voltage source 26), the overall impedance is smaller, thereby allowing more parasitic current to be absorbed within the branch, away from the power source 4. The operation of the active element serves not so much to cancel noise but rather to steer noise (e.g., steer noise away from the power source 4) so as to minimize the impact of the noise in terms of the generation of EMI. The boosting effect is typically active (or most pronounced) only within the frequency range of the active amplification network, and therefore as mentioned above does not contribute significantly to ground leakage current.

Figure 4:
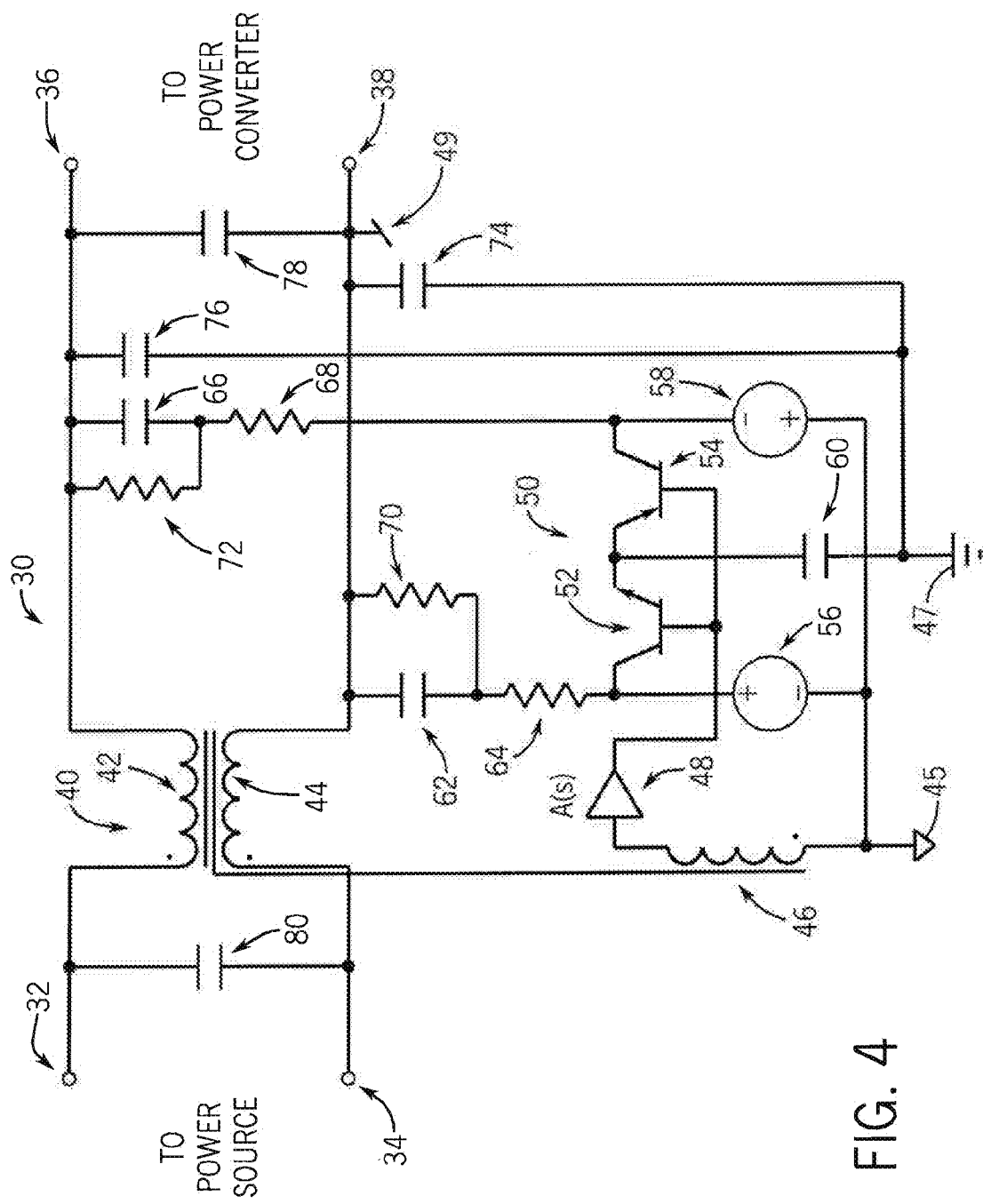
FIG. 4 is a schematic diagram showing a circuit capable of operating as the hybrid filter of FIG. 2, in accordance with at least some embodiments of the present invention.

Turning to FIG. 4, an additional schematic diagram is provided showing an exemplary circuit 30 that can be implemented as the hybrid filter 22 of FIG. 2 in accordance with at least some embodiments of the present invention. As shown, the circuit 30 includes first and second input terminals 32 and 34, respectively, which are configured to be coupled to the first and second output terminals 14 and 16, respectively, of the power source 4. The circuit 30 also includes first and second output terminals 36 and 38, respectively, which are configured to be coupled to the first and second input terminals 10 and 12, respectively, of the power converter 6. As further shown, the circuit 30 in the present embodiment (like the filter 2 of FIG. 1) includes an inductor 40 having first and second magnetically-coupled inductive portions (or windings) 42 and 44, respectively, and having a common mode inductance $L_{CM}$. The first magnetically-coupled inductive portion 42 links the terminal 32 with the terminal 36, while the second magnetically-coupled inductive portion 44 links the terminal 34 with the terminal 38.

Figure 5A:
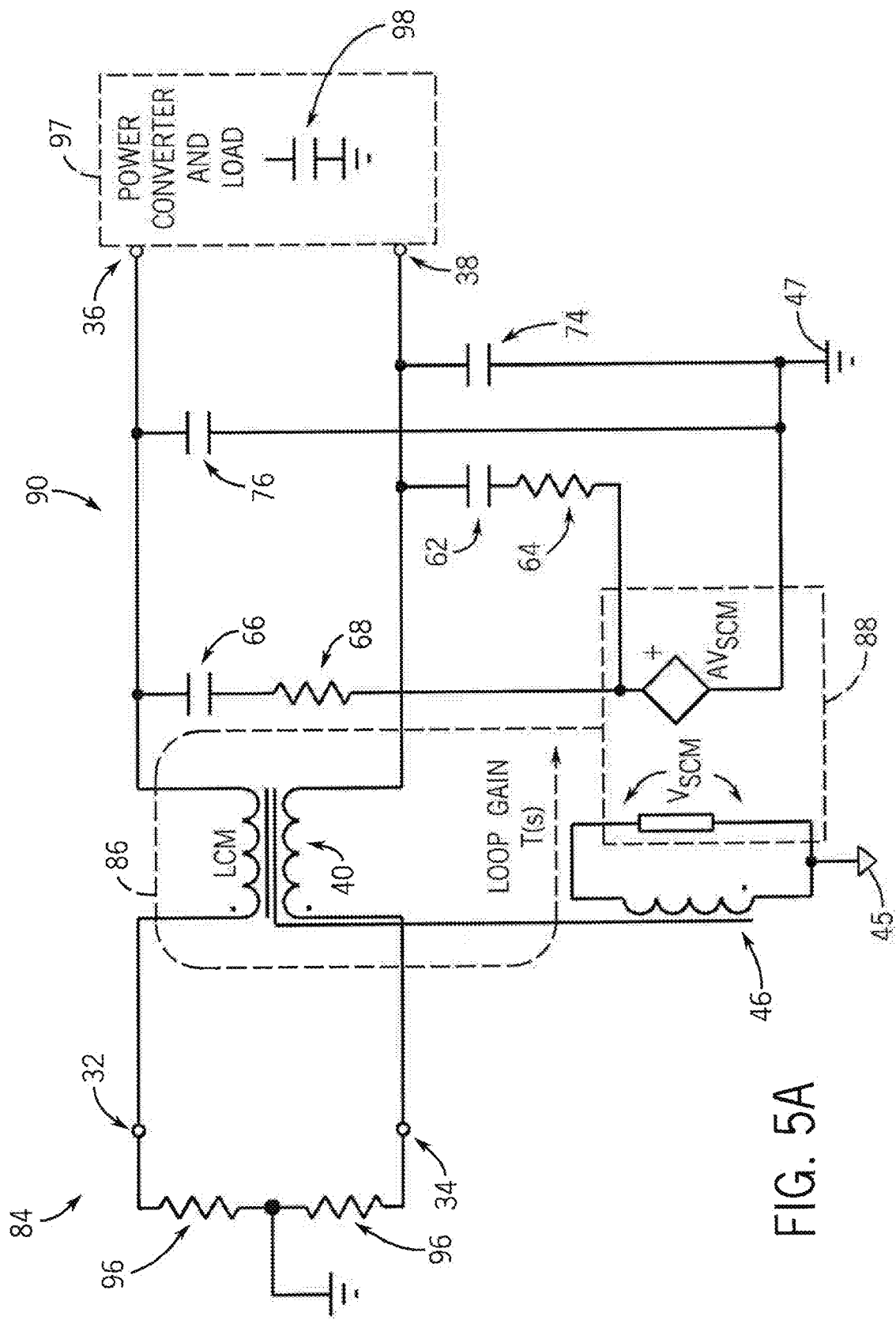
FIGS. 5A and 5B are schematic diagrams illustrating equivalent circuits capable of being used to develop an analytic model to determine performance of the hybrid filter of FIGS. 2 and 4.

In contrast to the inductor 3 shown in FIG. 1, the inductor 40 of the circuit 30 additionally includes (or is magnetically coupled to) an additional sense winding 46 in addition to the inductive portions 42 and 44. The sense winding 46 allows for the sensing of a common mode voltage $V_{SCM}$ (e.g., a voltage corresponding to $V_{CM}$ shown in FIG. 3) appearing across the inductor 40, which is the same across each of the inductive portions 42, 44 and across the sense winding (although the sense winding 46 is represented in FIG. 5A as an additional inductor, the purpose of the sense winding is merely to sense the voltage across the inductor 40 and the sense winding contributes relatively little, if any, inductance in addition to that of the inductive portions 42, 44). The sense winding 46 is coupled between a filter ground 45 and an input to an inverting operational amplifier 48 having a transfer function A(s) as shown. The operational amplifier 48 in particular operates as a gain amplifier where the gain varies/depends upon frequency, and thus the transfer function A(s) also constitutes a frequency response characteristic and a gain characteristic. Although the amplifier 48 of FIG. 4 can be a single operational amplifier as discussed above, in alternate embodiments the amplifier 48 could instead be (or be replaced by) a network of more than one operational amplifier (e.g., multiple cascaded operational amplifiers) and/or other devices (e.g., various transistor circuits). In general, the amplifier 48 is intended to be representative of a gain stage having a transfer function A(s).

The output signal from the amplifier 48 is a preconditioned version of the common mode voltage $V_{SCM}$ and is supplied to a linear push-pull power stage 50. The linear push-pull power stage 50 includes a first, NPN bipolar junction transistor (BJT) 52 and a second, PNP BJT 54, a first biasing voltage source 56, a second biasing voltage source 58, and a grounding capacitor 60. More specifically, the emitter of the first transistor 52 is coupled to the collector of the second transistor 54 and additionally to the capacitor 60, which in turn is coupled to an earth ground 47, which is different from the filter ground 45. The bases of each of the two transistors 52, 54 are coupled to the amplifier 48 and receive the output signal therefrom.

Additionally, the first biasing voltage source 56 is coupled between the collector of the first transistor 52 and the filter ground 45, while the second biasing voltage source 58 is coupled between the collector of the second transistor 54 and the filter ground. The first and second biasing voltage sources 56 and 58 are bidirectional voltage sources having opposite polarities, with the higher voltage terminal of the first biasing voltage source 56 being coupled to the collector of the first transistor 52 and the higher voltage terminal of the second biasing voltage source 58 being coupled to the filter ground 45. The amplifier 48 and the linear push-pull power stage 50 can be understood as corresponding (or equivalent) to the voltage $V_{CM}$ controlling the dependent voltage source 26 of FIG. 3, and this voltage source can be understood to be powered by the bidirectional voltage sources 56 and 58.

Further as shown in FIG. 4, the collector of the first transistor 52 is also coupled to a first passive common mode capacitor 62 by way of a first damping resistor 64, with that capacitor in turn being coupled between that damping resistor and the second output terminal 38. Additionally, the collector of the second transistor 54 is coupled to a second passive common mode capacitor 66 by way of a second damping resistor 68, with that capacitor in turn being coupled between that damping resistor and the first output terminal 36. Further as shown in FIG. 4, the circuit 30 includes first and second voltage balancing resistors 70 and 72, respectively, which are connected in parallel with the first and second common mode capacitors 62 and 66, respectively, to equalize their floating voltages. Neither the damping resistors, nor the balancing resistors, are necessary in all embodiments, and consequently the branch 24 of FIG. 3 does not show any such resistors. Rather, in at least some embodiments such as the embodiment of FIG. 4, these resistors are included to diminish the effect of imperfections in the operation of the capacitors, e.g., to reduce inaccuracies in performance due to leakage in the capacitors.

Each of the passive common mode capacitors 62, 66 corresponds to the common mode capacitor 28 shown in FIG. 3. However, in the circuit 30 shown in FIG. 4, there are two branches corresponding to the branch 24 shown in FIG. 3, namely, a first branch including the common mode capacitor 62 along with the active voltage source formed from the elements 46, 48 and 50, and a second branch including the common mode capacitor 66 along with the active voltage source formed from the elements 46, 48 and 50, where the same active voltage source is shared by both branches.

Further, in addition to the above-described components, the circuit 30 includes more components as follows. First, in addition to the two passive common mode capacitors 62 and 66 mentioned above, the circuit 30 also includes third and fourth passive common mode capacitors 74 and 76, respectively, which couple the second and first output terminals 38 and 36, respectively, to the earth ground 47 (as shown in FIG. 4, the output terminal 38 can further be considered as being coupled to an additional power ground 49 that differs from the filter ground 45 and the earth ground 47). Additionally, the circuit 30 includes a first differential mode capacitor 78 linking the first and second output terminals 36 and 38 to one another, and a second differential mode capacitor 80 linking the first and second input terminals 32 and 34 to one another. Since the circuit 30 of FIG. 4 operating as the hybrid filter 22 (and operating as an active capacitance booster) is embedded as part of, or otherwise implemented in conjunction with, the switching power converter 6, the selection of the amplifier gain A(s) plays a significant role in realizing desired system performance. By appropriately choosing A(s), the effectiveness of the proposed network can be designed to meet a certain set of performance specifications without increasing the capacitance values of the passive common mode capacitors (e.g., the capacitors 62, 66, 74 and 76 of FIG. 4) or the common mode inductance $L_{CM}$ of the inductor 40 (which potentially could also be understood to include a differential mode inductance).

Figure 5B:
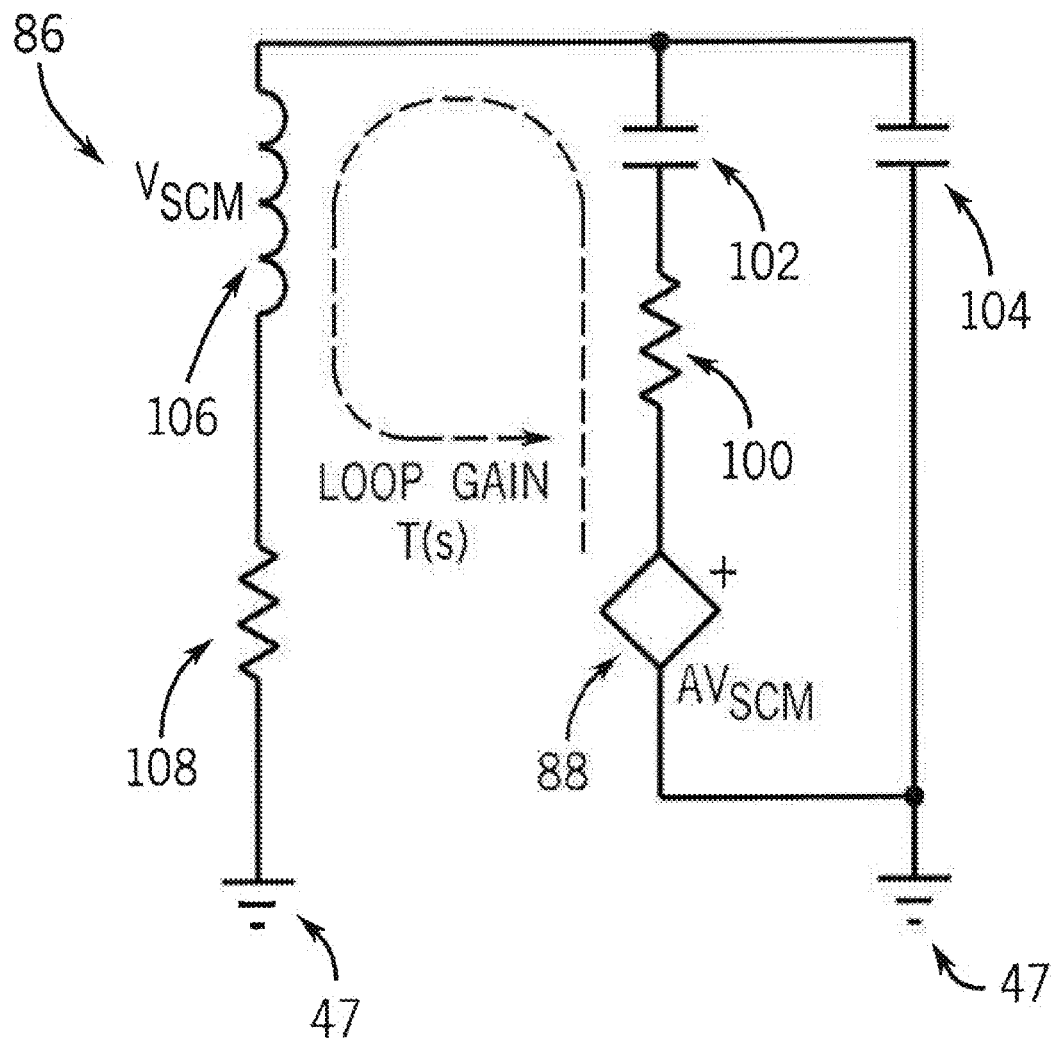

It is desirable in at least some embodiments to employ an analytical model so as to be able to predict the performance of a system such as that shown in FIG. 2 employing a hybrid filter such as the hybrid filter 22 formed using the circuit 30. In particular, it is desirable that one be capable of determining a closed loop transfer function $H_{cm}(s)$ of the circuit 30 when operating in combination with a power converter (and load) and power source, such as the power converter 6 (and load 8) and power source 4 of FIG. 2. Turning to FIGS. 5A and 5B, first and second simplified equivalent circuits 84 and 86, respectively, are provided that allow for the development of such an analytical model (or models) and the determination of such a closed loop transfer function. More particularly, these equivalent circuits allow for the proposed hybrid filter 22 to be analyzed in conjunction with the power source and power converter (and load) as a closed loop system having a loop gain and transfer function that determine the stability and performance of the system. Based upon these models, it is possible to determine a first transfer function $H_i(s)$ through the power system in the absence of the filter circuit, as well as a loop gain $T(s)$, which is equal to the product of the above-described transfer function $A(s)$ and $H_i(s)$. As discussed further below, the loop gain $T(s)$ can in turn be employed to evaluate the stability of the system as well as to arrive at the closed loop transfer function $H_{cm}(s)$.

Referring to FIG. 5A, a schematic diagram shows the equivalent circuit 84 as including a circuit 90 that is a simplified version of the circuit 30 of FIG. 4, which is representative of the common mode operation of the circuit 30. As shown, the circuit 90 includes the inductor 40 (including the sense winding 46), the capacitors 62, 66, 74 and 76, as well as the resistors 64 and 68 of the circuit 30. However, other components of the circuit 30 are not included. In particular, the elements that serve to reduce differential mode currents, namely, the differential mode capacitors 78 and 80, are not shown. Also, the voltage balancing resistors 70 and 72 are not shown since those resistors are assumed to be large enough to be treated as open circuits. As for the operational amplifier 48 and the elements forming the linear push-pull power stage 50 (which together with the sense winding 46 can be understood as corresponding to the voltage source 26 of FIG. 3), these elements are shown in a simplified form merely as a voltage amplifier 88 that operates as a voltage controlled voltage source outputting a voltage $AV_{SCM}$, where $V_{SCM}$ is the voltage occurring across the sense winding and A again is the value of the transfer function $A(s)$ at any given value of s. Operation of the voltage source 88, common mode capacitors 62, 66, 74 and 76, resistors 64, 68, and inductor 40 including sense winding 46 results in a feedback loop 86 being formed.

In addition to showing the circuit 90 corresponding to the circuit 30, the equivalent circuit 84 also presumes certain characteristics regarding the power source that is connected to the first and second input terminals 32, 34 of the circuit 90, as well as regarding a power converter and load (which are collectively labeled 97 in FIG. 5A) coupled to the output terminals 36, 38 of the circuit 90. The characteristics of the power source and power converter and load that are assumed will vary depending upon the embodiment—that is, to arrive at the equivalent circuit 84 in any given situation, the particular system in which the circuit 30 (or other filter circuit) is being implemented should be considered.

For purposes of the present example, it is presumed in developing the circuit 84 shown in FIG. 5A that the power source provides a connection to the earth ground 47 (or its equivalent, e.g., the body of a satellite) through some impedance. Further, it is presumed that this impedance provided by the power source, as viewed looking outward from the first and second input terminals 32, 34 of the circuit 90, can be represented (from an AC perspective) by a series combination of two equal resistances 96, with the node connecting those resistances being coupled to the earth ground. A standardized impedance of this type can be created, in a test environment, by attaching the power source to a line impedance stabilization network (LISN), which in turn is coupled to the terminals 32, 34. (Information regarding such a LISN can be found in "Military Standard, Measurement of Electromagnetic Interference Characteristics", MIL-STD-462 Rev. D, Jan. 11, 1993, U.S. Department of Defense, which is hereby incorporated by reference herein.)

Also, it is presumed that, while the output terminals 36, 38 are coupled to the power converter and load 97, the power converter and load can be treated as having a parasitic capacitance 98 linking the power converter and load to the earth ground 47 that is sufficiently small that the output terminals 36, 38 can be treated as being open-circuited from a common mode filtering perspective. Again, these assumptions regarding the power source, power converter and load are being made for the purposes of the present example of FIG. 5A and it should be understood that these assumptions are not necessarily applicable generally in relation to all power sources, power converters and loads that might be connected to the circuit 30 (for example, the above assumptions concerning the power converter and load might need to be modified in cases where the load is a DC motor employing switching circuitry).

Referring to FIG. 5B, the equivalent circuit 84 of FIG. 5A can be further simplified by absorbing identical parallel branches into one so as to arrive at the equivalent circuit 86. Namely, the parallel combination of the two pairs of capacitors and resistors 62, 64, 66 and 68 can be represented by a single resistor 100 in series with a single capacitor 102, where the resistor 100 has a value that is half that of either of the resistors 64, 68 and the capacitor 102 has a value that is twice that of either of the capacitors 62, 66. Also, the parallel combination of the capacitors 74, 76 can be represented as a single capacitor 104 having a value that is twice that of either of the capacitors 74, 76, and the two resistors 96 associated with the power source can be represented as a single resistor 108 having half the value of either of those resistors. Further, the inductor 40 and sense winding 46 can together be represented by an equivalent fictitious inductance 106 having the same voltage across it as the voltage across the inductor 40 and the sense winding, namely, $V_{SCM}$, and having half the common mode inductance $L_{CM}$ of the inductor 40. As a result of these simplifications, the overall equivalent circuit 86 merely includes the capacitor 104 in parallel with the series combination of the amplifier 88 (which in FIG. 5B is merely represented by a diamond indicating a voltage source), the resistor 100 and the capacitor 102, the combination of which is then coupled between the earth ground 47 and the series combination of the inductor 106 and the resistor 108. More particularly, the inductor 106 is coupled in between the resistor 108 and each of the capacitors 102, 104, and the capacitor 104 at its opposite end is coupled to the amplifier 88 and to the earth ground 47.

Given the circuit representations of FIGS. 5A-5B, $H_i(s)$ can be determined. In determining $H_i(s)$ based upon the circuits 84 and/or 86, several assumptions can be made. First, as is evident from FIGS. 5A and 5B, which do not include any components corresponding to the differential mode elements of FIG. 4 (e.g., the capacitors 78, 80), it is assumed that the differential mode elements in the circuit 30 play no role in the common mode signal analysis and can be ignored. Second, it is assumed that the voltage balancing resistors 70 and 72 of FIG. 4 are large enough to be open circuits and also can be ignored in the common mode signal analysis. Third, it is assumed that the voltage amplifier 88 (which is a push-pull amplifier since the power stage 50 is a linear push-pull power stage) is operating with unity gain. Fourth, it is assumed that the impedance of the forward path through the parasitic capacitance 98 is much larger than that of the backward path through the resistances 96 (and also that the parasitic capacitance 98 is much smaller than the capacitances within the filter circuit 90). Given these assumptions, $H_i(s)$ can be calculated by way of the following equation:

$$H_i(s) = \frac{H_o\left(1 + \frac{s}{\omega_1}\right)\left(1 + \frac{s}{\omega_4}\right)}{\left(1 + \frac{s}{\omega_2}\right)\left(1 + \frac{1}{Q_3}\frac{s}{\omega_3} + \frac{s^2}{\omega_3^2}\right)\left(1 + \frac{\omega_1}{s}\right)\left(1 + \frac{\omega_4}{s}\right)} \quad (2)$$

In this equation, $H_o$ is equal to the resistance of the resistor 108, $\omega_4$ is equal to the resistance of the resistor 108 divided by the inductance of the inductor 106, and $\omega_1$, $\omega_2$, $\omega_3$, $\omega_4$ and $Q_3$ can be determined via the following relations:

$$\omega_1 = \frac{1}{R_{Y1}C_{Y1}} \quad (3)$$

$$\omega_2 = \frac{1}{R_{Y1}[C_{Y1}\|C_Y]}$$

$$\omega_3 = \frac{1}{\sqrt{L_{CM}(C_{Y1} + C_Y)}}$$

$$Q_3 = \frac{1}{R_M + R_{Y1}} * \sqrt{\frac{L_{CM}}{C_{Y1} + C_Y}}$$

where $R_{Y1}$ is the resistance of either of the resistors 64 or 68, $C_{Y1}$ is the capacitance of either of the capacitors 62 or 66, $C_Y$ is the capacitance of either of the capacitors 74 or 76, $L_{CM}$ is the inductance of the inductor 40 (which is twice the inductance of the inductor 106), and $R_M$ is the resistance of one of the resistors 96.

$H_i(s)$ can be considered a system or "plant" transfer function, since it can be viewed as the transfer function of a system (or plant) that is to be controlled and stabilized. Also, $H_i(s)$ can be considered the frequency response transfer function of the voltage $V_{SCM}$ appearing across the sense winding 106 arising due to the excitation from the dependent voltage source 88. In any event, once the transfer function $H_i(s)$ is determined, then the loop gain $T(s)$ can be determined as the product of $H_i(s)$ and $A(s)$ (where, again, $A(s)$ is the transfer function between $AV_{SCM}$ and $V_{SCM}$, or the gain stage gain). The loop gain $T(s)$ is of interest since the circuit 90 effectively creates a control loop, with the controlled variable being the voltage $V_{SCM}$ across the common mode inductor (the sense winding 46). Although not possible in practice, ideally the voltage $V_{SCM}$ would be controlled to be zero, since if that voltage was zero, then there would be no common mode current and consequently no EMI generated by the power converter and load 97. In practice, it is sufficient that $V_{SCM}$ be reduced significantly. Additionally, in determining the loop gain $T(s)$, the operation of the circuit also should be considered from a stability perspective. Various approaches can be pursued in considering the stability issue including, for example, a consideration of Bode plots. It can be observed from equation (2), and the low frequency asymptotes of the frequency response function, that the circuit 86 (or circuit 84) has two inverted poles, leading to a phase lead of 180° at low frequencies. Therefore the preconditioning amplifier network needs to provide adequate phase lag at the lower gain crossover frequency of the loop-gain in order to maintain stability. In at least some embodiments, a simple first order roll-off can be chosen for $A(s)$ as the following:

$$A(s) = \frac{A_o}{1 + \frac{s}{\omega_5}} \quad (4)$$

where $\omega_5$ is a corner frequency chosen such that the overall system transfer function meets desired stability requirements.

Upon determining the loop gain $T(s)$, then the closed loop transfer function $H_{cm}(s)$ can be determined based upon the following relation:

$$H_{cm}(s)\Big|_{T(s)} = \frac{H_i(s)}{1 + T(s)} \quad (5)$$

Figure 6:
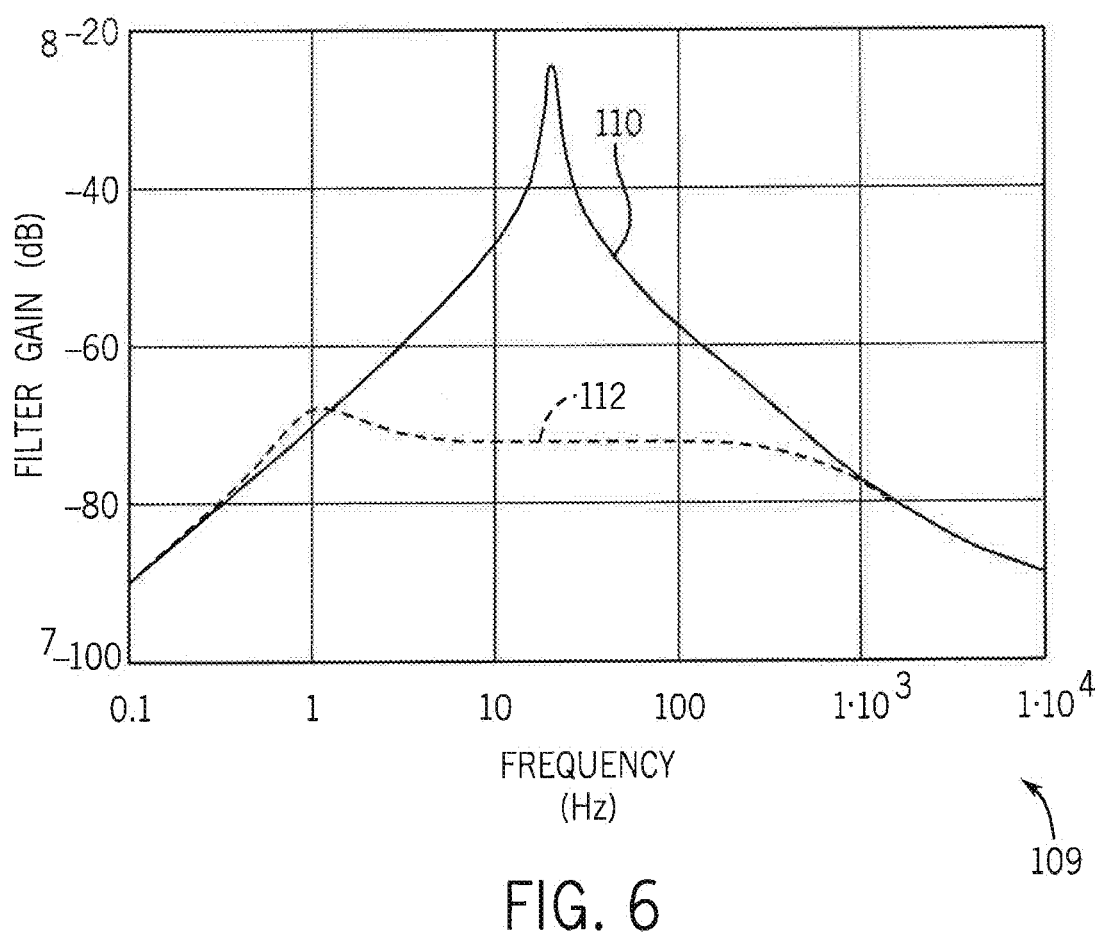
FIG. 6 is a graph comparing the performance, in terms of a closed loop transfer function $H_{cm}(s)$, of a conventional power converter operating in conjunction with only a passive filter arrangement such as that of FIG. 1 with that of a power converter operating in conjunction with an improved hybrid filter such as that described with reference to FIGS. 2-5B.

With the hybrid filter operational, the transfer function between the common mode voltage and the measurement point at the power source, $H_{cm}(s)$, ideally is zero. The extent to which $H_{cm}(s)$ approaches zero (or is reduced) is a measure of the success of the filter in reducing common mode current and thus reducing the EMI of the power converter. Referring to FIG. 6, a graph 109 is provided comparing the performance, in terms of the closed loop transfer function $H_{cm}(s)$, of a conventional power converter operating in conjunction with only a passive filter arrangement such as that of FIG. 1 (represented by a solid line 110) with that of a power converter operating in conjunction with a hybrid filter such as that described with reference to FIGS. 2-5B (represented by a dashed line 112). As is evident, the values of $H_{cm}(s)$ that are achieved by way of the hybrid filter arrangement are generally equal to or significantly less than those achieved by way of the conventional filter arrangement. It should be noted that, in this example, the active common-mode capacitance booster (e.g., the voltage controlled voltage source) of the hybrid filter is effective within the bandwidth of the loop gain between 1 kHz and about 800 kHz, with adequate phase margins at both crossover frequencies (it should further be noted that this frequency range is appropriate particularly for one exemplary test setup and that other systems/realizations of the present invention may have different operational bandwidths).

Although FIGS. 4-5B show a particular embodiment of hybrid filter design, the present embodiment is intended to encompass a variety of different designs in which there are both passive and active filter components, particularly designs in which the active filter components include at least one voltage source (albeit the voltage source need not always be a voltage controlled voltage source), and/or designs in which an active element varies an overall capacitance so as to steer common mode current away from a power converter/load or source. In comparison with some conventional filter designs, at least some embodiments of the present invention are advantageous in that they operate to boost capacitance values to be larger only within a predefined frequency range (or ranges) rather than generally over all frequencies. Further, the increased capacitance is a result of small signal boosting, and capacitance is not increased from a power perspective.

While the particular embodiment described above with respect to FIGS. 2-5 envisions that parasitic capacitance/current in a power converter such as the power converter 6 is the primary source of EMI, it is also possible in other embodiments that EMI is the result of parasitic capacitance/current occurring in locations other than (or in addition to) the power converter. For example, parasitic capacitance/current could be occurring in the load, for example, if the load included a power converter of its own or a device including switching devices such as a DC motor. In such embodiments, a hybrid filter could be coupled to the output terminals of the power converter rather than to the input terminals of the power converter, or multiple hybrid filters coupled to each of these locations or other locations could be employed.

Further, the particular analysis and formulas described above (e.g., concerning $H_i(s)$, $A(s)$, $T(s)$ and $H_{cm}(s)$) are intended merely as an example given the assumptions described above, and the present invention is intended to encompass a variety of other embodiments used in different application situations that may require different assumptions, analysis and corresponding formulas. Indeed, the present invention is intended to encompass a variety of embodiments of filters and filter circuits employed in relation to a variety of different power converters such as those described above, and in a variety of applications including, but not limited to, aerospace applications, automotive applications (e.g., traction-related applications), applications in commercial facilities (e.g., utilities, industrial and/or military applications), and residential/household applications such as in personal (e.g., desktop or laptop) computers and various appliances (e.g., refrigerators).

It is specifically intended that the present invention not be limited to the embodiments and illustrations contained herein, but include modified forms of those embodiments including portions of the embodiments and combinations of elements of different embodiments as come within the scope of the following claims.

We claim:

1. A hybrid filter for use in reducing EMI, the hybrid filter comprising:
    a passive filtering component;
    an active filtering component coupled at least indirectly to the passive filtering component,
    wherein the active filtering component includes a voltage controlled voltage source that is controlled by a sensed common mode voltage, and wherein the hybrid filter operates to reduce a level of a common mode current,
    whereby the EMI generated due to the common mode current is reduced.

2. The hybrid filter of claim 1, wherein the passive filtering component includes a filter capacitor.

3. The hybrid filter of claim 2, further comprising an additional passive filtering component that is a first inductor.

4. The hybrid filter of claim 3, wherein the voltage controlled voltage source operates in response to a voltage experienced across at least one of the first inductor and a second inductor that is magnetically coupled to the first inductor.

5. The hybrid filter of claim 2, wherein the voltage controlled voltage source serves to adjust an effective overall capacitance that includes a first capacitance provided by the filter capacitor.

6. The hybrid filter of claim 1, wherein the voltage controlled voltage source includes a power stage having at least one transistor.

7. The hybrid filter of claim 1, wherein the voltage controlled voltage source includes a gain generating device having a first transfer function $A(s)$.

8. The hybrid filter of claim 7, wherein the hybrid filter has a loop gain $T(s)$ equaling a product of the first transfer function $A(s)$ and a second transfer function.

9. The hybrid filter of claim 7, wherein the hybrid filter serves to reduce values of a closed loop transfer function $H_{cm}(s)$ over a first range of a frequency spectrum.

10. The hybrid filter of claim 1, further comprising at least one component capable of filtering a differential mode current.

11. A power conversion device, wherein the hybrid filter of claim 1 is either coupled in combination with the power conversion device or included as a part of the power conversion device.

12. The power conversion device of claim 11, wherein the hybrid filter is either coupled to an input terminal of the power conversion device or coupled to an output terminal of the power conversion device.

13. The power conversion device of claim 11, wherein the power conversion device is selected from the group consisting of a DC to DC converter, an AC to DC converter, a DC to AC converter, and an AC to AC converter.

14. The power conversion device of claim 11, wherein the power conversion device is a multiphase device.

15. An apparatus employing the power conversion device of claim 11, wherein the apparatus is selected from the group consisting of a first apparatus capable of being implemented in an automobile, a second apparatus capable of being implemented in an aerospace vehicle, and a third apparatus capable of being implemented in a home appliance, and a fourth apparatus capable of being implemented in a commercial facility.

16. A hybrid filter for use in relation to a power conversion device, the hybrid filter comprising:
    an active filtering component that includes a voltage controlled voltage source that is controlled by a sensed common mode voltage and operates to provide a variable first capacitance, and wherein as a result the hybrid filter operates to reduce a level of a common mode current within the power conversion device,
    whereby an amount of EMI generated by the power conversion device is reduced, and wherein the hybrid filter additionally comprises a passive filtering component including a filter capacitor that is coupled at least indirectly to the active filtering component, and wherein the active filtering component serves to adjust an overall capacitance including both the variable first capacitance and a second capacitance provided by the filter capacitor.

17. The hybrid filter of claim 16, wherein the hybrid filter is configured to be either coupled at least indirectly in combination with the power conversion device or included as a part of the power conversion device.

18. A method of operating a power conversion device in a manner resulting in a reduction in an EMI generated by the power conversion device, the method comprising:
    providing a hybrid filter that is implemented in combination with the power conversion device, wherein the hybrid filter includes a passive filter component and an active filter component, the active filter component including a voltage controlled voltage source that is controlled by a sensed common mode voltage; and
    operating the active filter component so that an overall common mode reactance including a first capacitance of the passive filter component is varied over frequency, and so that a common mode current occurring within the power conversion device is reduced,
    whereby the EMI generated by the power conversion device is reduced.

* * * * *

UNITED STATES PATENT AND TRADEMARK OFFICE
CERTIFICATE OF CORRECTION

PATENT NO. : 7,595,687 B2  Page 1 of 1
APPLICATION NO. : 11/496298
DATED : September 29, 2009
INVENTOR(S) : Mortensen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 399 days.

Signed and Sealed this

Twenty-eighth Day of September, 2010

David J. Kappos
*Director of the United States Patent and Trademark Office*